(12) United States Patent
Lota

(10) Patent No.: US 7,566,040 B2
(45) Date of Patent: Jul. 28, 2009

(54) CENTER CONSOLE HAVING HIDDEN STORAGE

(75) Inventor: Charan Singh Lota, Canton, MI (US)

(73) Assignee: Toyota Motor Engineering & Manufacturing North America, Inc., Erlanger, KY (US)

(*) Notice: Subject to any disclaimer, the term of this patent is extended or adjusted under 35 U.S.C. 154(b) by 447 days.

(21) Appl. No.: 11/346,841

(22) Filed: Feb. 3, 2006

(65) Prior Publication Data

US 2007/0182183 A1   Aug. 9, 2007

(51) Int. Cl.
 *B60R 7/00* (2006.01)
(52) U.S. Cl. .............. 248/311.2; 248/314; 224/926
(58) Field of Classification Search ......... 248/311.2, 248/314; 224/926, 275; 108/44
See application file for complete search history.

(56) References Cited

U.S. PATENT DOCUMENTS

| | | | | |
|---|---|---|---|---|
| 4,848,627 A | * | 7/1989 | Maeda et al. | 224/275 |
| 5,085,481 A | * | 2/1992 | Fluharty et al. | 296/37.8 |
| 5,094,375 A | * | 3/1992 | Wright | 224/404 |
| 5,246,151 A | * | 9/1993 | Jabara | 224/544 |
| 7,322,500 B2 | * | 1/2008 | Maierholzner | 224/486 |
| 7,344,056 B2 | * | 3/2008 | Shelmon et al. | 224/549 |
| 2006/0043249 A1 | * | 3/2006 | Han | 248/311.2 |
| 2006/0076468 A1 | * | 4/2006 | Shin | 248/311.2 |
| 2007/0119855 A1 | * | 5/2007 | Ishida et al. | 220/737 |

* cited by examiner

*Primary Examiner*—J. Allen Shriver
*Assistant Examiner*—Steven Marsh
(74) *Attorney, Agent, or Firm*—Gifford, Krass, Sprinkle, Anderson & Citkowski, P.C.

(57) ABSTRACT

A center console includes a bin and a cup holder. The bin has a bottom wall extending between a plurality of generally upright side walls. The cup holder is removably seated in the bin. The cup holder has a top face adapted to support a beverage container. The cup holder has a side face extending generally orthogonally between the top face and a bottom edge. The side face has an upper edge vertically spaced apart from a bottom end of the side face to receive a hand therethrough when the cup holder is partially lifted from the bin to facilitate removal of the cup holder from the bin.

7 Claims, 3 Drawing Sheets

CENTER CONSOLE HAVING HIDDEN STORAGE

BACKGROUND OF THE INVENTION

1. Field of the Invention

The invention relates to center consoles for automotive vehicles. More particularly, the invention relates to a center console having a cup holder that is removable to reveal a hidden storage compartment.

2. Description of the Related Art

Automotive vehicles include a variety of compartments for storing various items within the interior of the vehicle. Such compartments include center console pockets, bins, door pockets, trunk and glove compartments. It is widely known to provide lockable hinged doors or lids for securing items stored in these compartments. Nonetheless, conventional storage compartments in vehicle interiors remain particularly vulnerable to theft due to the fact that they are provided in most vehicles and are plainly visible from both outside and inside of the vehicle. Thus, it remains desirable to provide concealed compartments for storing valuable items in the interior of the vehicle.

SUMMARY OF THE INVENTION

According to one aspect of the invention, center console is provided for use in an interior of an automotive vehicle. The center console includes a bin and a cup holder. The bin has a bottom wall extending between a plurality of generally upright side walls. The cup holder is removably seated in the bin. The cup holder has a top face adapted to support a beverage container. The cup holder has a side face extending generally orthogonally between the top face and a bottom edge. The side face has an upper edge vertically spaced apart from a bottom end of the side face to receive a hand therethrough when the cup holder is partially lifted from the bin to facilitate removal of the cup holder from the bin.

BRIEF DESCRIPTION OF THE DRAWINGS

Advantages of the present invention will be readily appreciated as the same becomes better understood by reference to the following detailed description when considered in connection with the accompanying drawings, wherein.

DETAILED DESCRIPTION OF THE INVENTION

Figure 1:
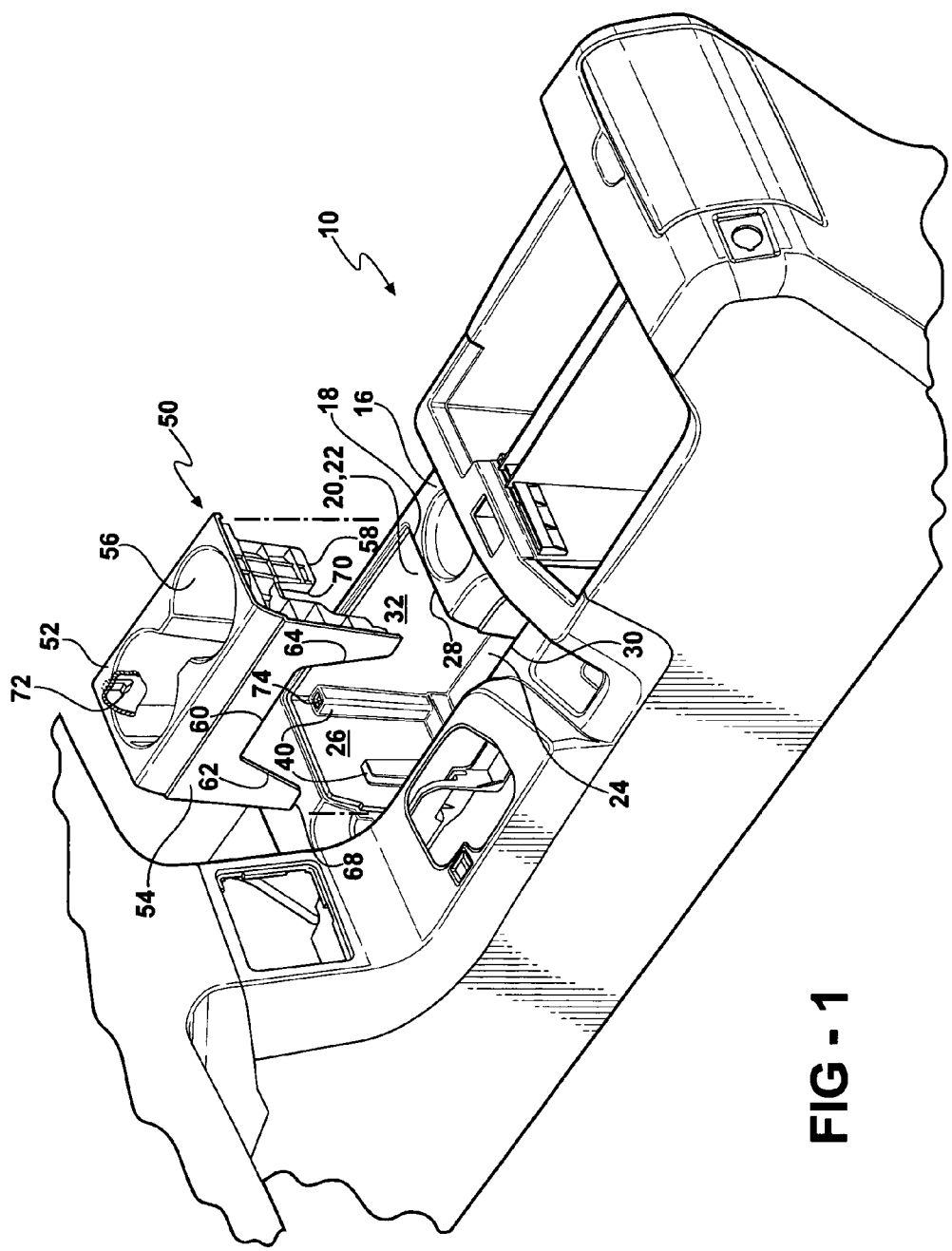
FIG. 1 is an exploded perspective view of a center console according to one embodiment of the invention, with the cup holder removed from the bin.
Figure 2:
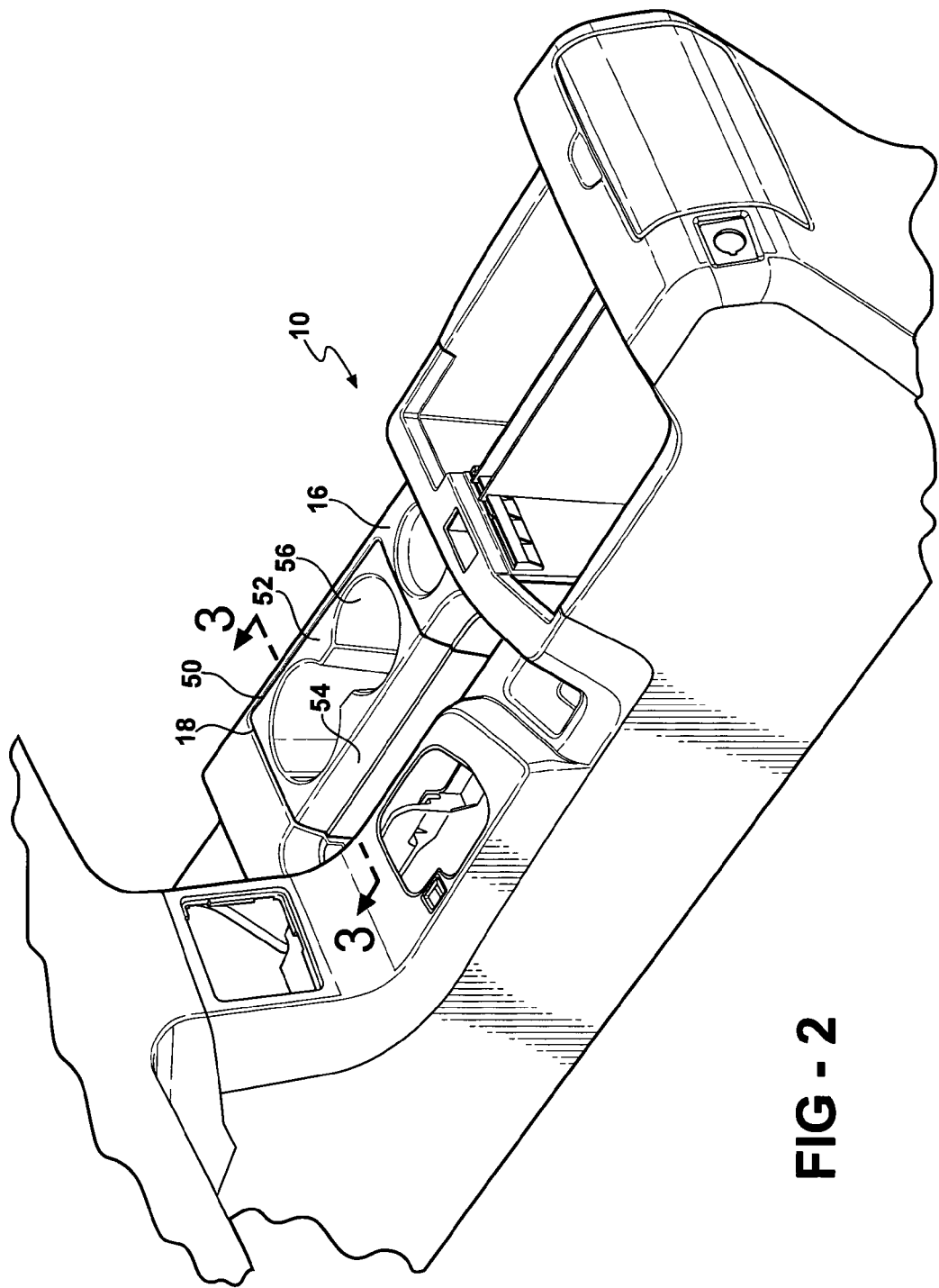
FIG. 2 is a perspective view of the center console with the cup holder installed in the bin.

Referring to FIGS. 1 and 2, a center console for an automotive vehicle is generally indicated at 10. The console 10 is disposed between front driver and passenger seats. The console 10 includes an outer surface 16. A peripheral edge 18 defines an opening 20 in the outer surface 16. The opening 20 provides access to a recessed bin 22. The bin 22 can store a variety of items, such as sunglasses, pens, coins, CD jewel boxes and the like. Described in greater detail below, a cup holder is insertable into the opening to conceal the bin and its contents. The cup holder is also removable from the opening to allow access to the bin.

The bin 22 includes a bottom wall 24 that extends generally between a front wall 26, a rear wall 28 and a pair of side walls 30, 32. One of the side walls 30 is shorter in height than the other side wall 32. A vertically extending guide rib 40 protrudes inwardly from one of the walls 26 to reduce the amount of force associated with the removal of the cup holder from the bin 22. In one embodiment of the invention, the bin 22 includes a plurality of ribs 40 that are spaced apart at generally opposite sides of the bin 22 relative to each other.

The cup holder is generally indicated at 50. The cup holder 50 includes a top face 52 and a side face 54. The cup holder 50 also includes a bottom surface 58 opposite the top face 52. In one embodiment of the invention, the top face 52 is substantially flush with the outer surface 16 of the console 10 when the cup holder 50 is seated in the bin 22. A recess 56 is formed in the top face 52 for supporting a beverage container. A generally inverted U-shaped cut-out is formed in the side face 54 of the cup holder 50. The cutout is defined by a generally horizontal upper edge 60 extending between a spaced apart pair of side edges 62, 64. The upper edge 60 is vertically spaced apart from a bottom end 68 of the side face 54.

The cup holder 50 includes a recess 70 for receiving the guide rib 40 therein for guiding and locating the cup holder 50 relative to the console 10 as it is inserted into the bin 22. The cup holder 50 also includes a retaining hook 72 for engaging a corresponding slot 74 formed at a top end of one of the ribs 40 for retaining the cup holder 50 in the bin 22.

Figure 3:
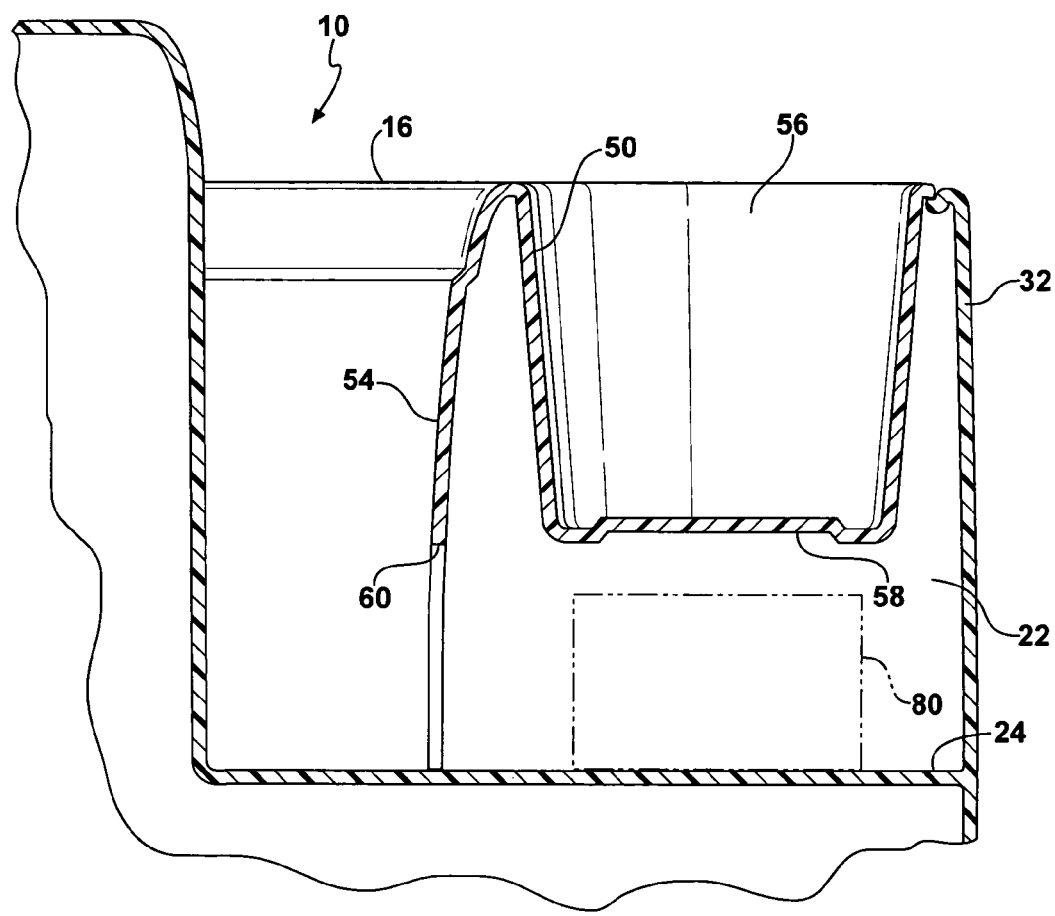
FIG. 3 is a cross sectional view of the center console with the cup holder installed in the bin.

In use, the cup holder 50 is seated in the bin 22 for use as a receptacle for holding a beverage container. A gap is formed between the upper edge 60 and the wall 30 when the cup holder 50 is partially lifted out of the bin 22. A hand may be inserted through the gap to facilitate removal of the cup holder 50 from the bin 22. The cup holder 50 is removed to reveal and allow access to the bin 22. Items can be placed in the bin 22. The cup holder 50 can be reinserted in the bin 22 for enclosing the items in the bin 22. As best shown in FIG. 3, the bottom surface 58 of the cup holder 50 is spaced apart from the bottom wall 24 of the bin 22 to accommodate the items 80 placed in the bin 22. The top face 52 of the cup holder 50 is flush with the outer surface 16 of the console 10, thereby concealing the presence of the bin 22 and items contained therein.

The invention has been described in an illustrative manner. It is, therefore, to be understood that the terminology used is intended to be in the nature of words of description rather than of limitation. Many modifications and variations of the invention are possible in light of the above teachings. Thus, within the scope of the appended claims, the invention may be practiced other than as specifically described.

The invention claimed is:

1. A center console for use in an interior of an automotive vehicle, the center console comprising:
a bin having a bottom wall extending between a plurality of generally upright side walls;
a cup holder removably seated in the bin, the cup holder having a top face adapted to support a beverage container, the cup holder having a side face extending generally orthogonally to a bottom edge, the side face having an upper edge vertically spaced apart from the bottom edge so as to receive a hand therethrough when the cup holder is partially lifted from the bin to facilitate removal of the cup holder from the bin;
at least one rib extending along at least one of the side walls of the bin to help guide installation and removal of the cup holder from the bin, and wherein one of the at least one rib includes a top surface having a slot; and a retaining member, wherein the retaining member extends through the slot so as to lockingly engage the console and retain the cup holder in the bin, and wherein the retaining member may be disengaged from the slot so as to release the cup holder from the bin.

2. A center console as set forth in claim 1 wherein the top face is substantially flush with an outer wall of the center console when the cup holder is seated in the bin.

3. A center console as set forth in claim 1, wherein the side face is substantially flush with an outer wall of the center console when the cup holder is seated in the bin.

4. A center console as set forth in claim 1, wherein the upper edge extends between spaced apart side edges to define a generally U-shaped cutout in the side face of the cup holder.

5. A center console as set forth in claim 1, wherein the cup holder includes a bottom surface spaced apart from the bottom wall of the bin to define a hidden storage space therebetween.

6. A center console as set forth in claim 1, wherein the bin includes opposite inner and outer walls, the inner wall being shorter in height relative to the outer wall, the upper edge of the cup holder being vertically spaced apart from an upper end of the inner side wall of the bin to receive a hand therethrough to facilitate removal of the cup holder from the bin.

7. A center console as set forth in claim 1, wherein the cup holder includes a recess for receiving the at least one rib therein for locating the cup holder relative to the console during insertion of the cup holder into the bin.

* * * * *